United States Patent Office 3,488,392
Patented Jan. 6, 1970

3,488,392
SULFUR CONTAINING PEROXYKETALS
Wilbur H. McKellin, Buffalo, N.Y., assignor to Pennwalt Corporation, a corporation of Pennsylvania
No Drawing. Continuation-in-part of application Ser. No. 614,024, Feb. 6, 1967. This application Feb. 29, 1968, Ser. No. 709,170
Int. Cl. C07c 161/00
U.S. Cl. 260—607                    6 Claims

ABSTRACT OF THE DISCLOSURE

A class of sulfur containing peroxyketals having at least two peroxy groups attached to the same carbon atom of an aliphatic group having at least two carbon atoms, and including at least one substituted sulfonyl, substituted sulfoxide or substituted sulfide group are disclosed as useful polymerization initiators. Illustrative general formulae are:

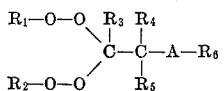

and

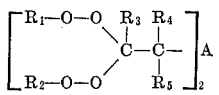

where A is —S—, —S(O)—, or —S(O)$_2$—.

CROSS-REFERENCE TO RELATED APPLICATIONS

This is a continuation-in-part of my copending application Ser. No. 614,024 filed Feb. 6, 1967, now abandoned, which in turn is a continuation-in-part of application Ser. No. 350,185 filed Mar. 9, 1964 now U.S. Patent 3,308,163 issued Mar. 7, 1967.

BACKGROUND OF THE INVENTION

The present invention relates to a new class of peroxy compounds, sulfur containing peroxyketals, and their utilization in polymerization reactions.

Hydroperoxides containing sulfur have been disclosed by Oswald et al., U.S. Patent 3,043,824 issued July 10, 1962, and were prepared by the co-oxidation of mercaptans with olefins or diolefins. Weissermel et al., U.S. Patent 3,192,264 issued June 29, 1965, disclose the reaction of hydroperoxides with vinyl sulfones to form sulfonyl peroxide of the type, R—SO$_2$—CH$_2$CH$_2$OOR.

SUMMARY OF THE INVENTION

It has now been discovered that a new class of sulfur containing peroxides, namely peroxyketals, can be prepared by the reaction of hydroperoxides with ketones having sulfonyl, sulfoxide, or sulfide substituent groups present in the backbone.

These compounds have at least 2 peroxy groups (—OOH or —OOR) joined to at least one carbon atom of an aliphatic group having at least two carbon atoms and including at least one group from the class consisting of substituted sulfonyl, substituted sulfoxide and substituted sulfide. Two peroxy groups may be joined to a common carbon atom. The sulfur containing group may be joined to a carbon atom which is free of substituent peroxy group(s).

The products of this invention are useful as sources of free radicals which can be used to initiate the polymerization of monomers; as synergists with organic bromine compounds in flame-retardant compositions, as crosslinking or curing agents in polyester resin formulations and as crosslinking and/or insolubilizing agents for polyvinyl chloride compositions.

DESCRIPTION AND EMBODIMENTS

Certain compounds of this invention may be represented by the following general formulae:

I.

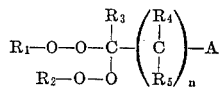

and

II.

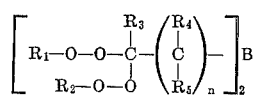

where:

$n$ is an integer at least one;
A is a radical R$_6$S(O)$_2$—, R$_6$S(O)—, or R$_6$S—;
B is a biradical —S(O)$_2$—, —S(O)—, —S—,
    —S—D—S—, —S(O)—D—S,
    —S(O)—D—S(O)—, —S(O)$_2$—D—S(O)$_2$—,
    or —S(O)$_2$—D—S(O)—;
D is an aliphatic biradical having 1–18 carbon atoms, a cycloaliphatic biradical having 4–12 carbon atoms, or an aromatic biradical having 6–15 carbon atoms;
R$_1$ and R$_2$ are hydrogen, aliphatic having 1–15 carbon atoms, or cycloaliphatic having 4–12 carbon atoms;
R$_3$ is aliphatic having 1–18 carbon atoms or cycloaliphatic having 4–12 carbon atoms;
R$_4$ and R$_5$ are hydrogen, aliphatic having 1–18 carbon atoms, or cycloaliphatic having 4–12 carbon atoms;
R$_6$ is hydrogen, aliphatic having 1–18 carbon atoms, cycloaliphatic having 4–12 carbon atoms, or aromatic having 6–15 carbon atoms; and
R$_3$ and R$_4$, R$_4$ and R$_5$, R$_3$ and R$_6$, or R$_4$ and R$_6$ taken together may form a ring.

The terms aliphatic and cycloaliphatic as used in this invention are understood to include araliphatic, that is aromatic substituents may be present.

REACTANTS

Illustrative of hydroperoxides which are operable in the process of this invention are hydrogen peroxide and aliphatic hydroperoxides including:

t-butyl-hydroperoxide,
chloro-t-butyl-hydroperoxide,
t-amyl hydroperoxide,
1,1,3,3-tetramethylbutyl hydroperoxide,
cumene hydroperoxide,
p-menthane hydroperoxide,
diisopropylbenzene hydroperoxide, and
2-methyl-2-hydroperoxy-2-hydroxy pentane.

Sulfur containing ketones illustrative of those to be reacted with the aforementioned hydroperoxides are:

1-methylmercapto-2-propane,
1-methylmercapto-3-butanone,
1-methylmercapto-4-pentanone,
1-methylmercapto-3-pentanone,
1-ethylmercapto-2-propanone,
1-propylmercapto-2-propanone,
1-butylmercapto-2-propanone,
1-isopropylmercapto-2-propanone,
1-sec-butylmercapto-2-propanone,
1-isobutylmercapto-2-propanone,
1-t-butylmercapto-2-propanone,
1-hexylmercapto-2-propanone,
1-hexylmercapto-3-butanone,
1-dodecylmercapto-2-propanone,
1-dodecylmercapto-3-butanone, 1-n-octadecylmercapto-2-propanone,
1-n-octadecylmercapto-3-butanone,
2-n-octadecylmercapto-2-methyl-4-pentanone,
1-(2-methoxycarbonylethylmercapto)-3-butanone,
1-(3-chloropropylmercapto)-3-butanone,
1-phenylmercapto-2-propanone,
1-phenylmercapto-3-butanone,
1-(4-t-butylphenylmercapto)-3-butanone,
1-(4-chlorophenylmercapto)-3-butanone,
1-β-naphthylmercapto-3-butanone,
1-benzylmercapto-2-propanone,
1-benzylmercapto-3-butanone,
1-(3-phenylpropylmercapto)-2-propanone,
1-cyclohexylmercapto-2-propanone,
1-cyclohexylmercapto-3-butanone,
1-cyclohexylmercapto-3-pentanone,
2-methyl-2-phenylmercapto-4-pentanone,
4-thiacyclohexanone,
3-butylmercapto-3,5,5-trimethyl-1-cyclohexanone,
4-thia-2,6-heptanedione,
5-thia-2,8-nonanedione,
4,7-dithia-2,9-decanedione,
4,17-dithia-2,19-eicosanedione,
1,4-bis(4-oxo-2-thiapentyl)benzene,
2,8-dithia-5-nonanone,
1,5-bis(phenylmercapto)-3-pentanone,
1-(2-oxopropylmercapto)-3-(1-methyl-5-oxo-3-thiahexyl)-6-methylcyclohexane, and the corresponding sulfoxide and sulfone derivatives which can be considered to be the successive oxidation products of the illustrative simple sulfides listed.

COMPOUNDS

Illustrative hydroperoxy compounds of the invention representative of the simplest reaction products of hydrogen peroxide and the ketone group, recognizing that ketone peroxide products are well known to be mixtures containing the subsequent reaction products of the initially formed product, are:

1-methylsulfonyl-2,2-dihydroperoxypropane,
1-phenylsulfonyl-2,2-dihydroperoxypropane,
1-phenylsulfonyl-3,3-dihydroperoxybutane,
1-phenylsulfonyl-3,3-dihydroperoxypentane,
2-methyl-2-phenylsulfonyl-4,4-dihydroperoxypentane,
1-(t-butylsulfinyl)-3,3-dihydroperoxybutane,
1-n-octadecylsulfinyl-2,2-dihydroperoxypropane,
2,2,6,6-tetrahydroperoxy-4-thiaheptane-4-oxide,
2,2,6,6-tetrahydroperoxy-4-thiaheptane-4,4-dioxide,
2,2,8,8-tetrahydroperoxy-5-thianonane-5-oxide,
2,2,8,8-tetrahydroperoxy-5-thianonane-5,5-dioxide,
2,2,6,6-tetrahydroperoxy-3,5-dimethyl-4-thiaheptane-4-oxide,
2,2,6,6-tetrahydroperoxy-3,5-dimethyl-4-thiaheptane-4,4-dioxide,
2,2,9,9-tetrahydroperoxy-4,7-dithiadodecane-4,7-dioxide,
2,2,9,9-tetrahydroperoxy-4,7-dithiadodecane-4,4,7,7-tetraoxide,
1-(2-methoxycarbonylethylsulfinyl)-3,3-dihydroperoxybutane.
1-(2-methoxycarbonylethylsulfonyl)-3,3-dihydroperoxybutane.

Additional illustrative compounds are:

1-methylmercapto-2,2-bis(t-butylperoxy) propane,
1-methylmercapto-3,3-bis(t-butylperoxy) butane,
1-methylmercapto-4,4-bis(t-butylperoxy) pentane,
1-methylmercapto-3,3-bis(t-butylperoxy) pentane,
1-ethylmercapto-2,2-bis(t-butylperoxy) propane,
1-propylmercapto-2,2-bis(t-butylperoxy) propane,
1-isopropylmercapto-2,2-bis(t-butylperoxy) propane,
1-butylmercapto-2,2-bis(t-butylperoxy) propane,
1-isobutylmercapto-2,2-bis(t-butylperoxy) propane,
1-sec-butylmercapto-2,2-bis(t-butylperoxy) propane,
1-t-butylmercapto-2,2-bis(t-butylperoxy) propane,
1-t-butylmercapto-3,3-bis(t-butylperoxy) butane,
1-hexylmercapto-2,2-bis(t-butylperoxy)propane,
1-hexylmercapto-3,3-bis(t-butylperoxy)butane,
1-dodecylmercapto-2,2-bis(t-butylperoxy)propane,
1-dodecylmercapto-3,3-bis(t-butylperoxy)butane,
1-n-octadecylmercapto-2,2-bis(t-butylperoxy)propane,
1-n-octadecylmercapto-3,3-bis(t-butylperoxy)butane,
2-n-octadecylmercapto-2-methyl-4,4-bis(t-butylperoxy) pentane,
1-(2-methoxycarbonylethylmercapto)-3,3-bis(t-butylperoxy)butane,
1-(3-chloropropylmercapto)-3,3-bis(t-butylperoxy) butane,
1-phenylmercapto-2,2-bis(t-butylperoxy)propane,
1-phenylmercapto-3,3-bis(t-butylperoxy)butane,
1-(4-t-butylphenylmercapto)-3,3-bis(t-butylperoxy) butane,
1-(4-chlorophenylmercapto)-3,3-bis(t-butylperoxy) butane,
1-(β-naphthylmercapto)-3,3-bis(t-butylperoxy)butane,
1-benzylmercapto-2,2-bis(t-butylperoxy)propane,
1-benzylmercapto-3,3-bis(t-butylperoxy)butane,
1-(3-phenylpropylmercapto)-2,2-bis(t-butylperoxy) propane,
1-cyclohexylmercapto-2,2-bis(t-butylperoxy)propane,
1-cyclohexylmercapto-3,3-bis(t-butylperoxy)butane,
1-cyclohexylmercapto-3,3-bis(t-butylperoxy)pentane,
2-methyl-2-phenylmercapto-4,4-bis(t-butylperoxy) pentane,
4,4-bis(t-butylperoxy)thiacyclohexane,
1,1-bis(t-butylperoxy)-3-butylmercapto-3,5,5-trimethyl-cyclohexane,
2,2,6,6-tetrakis(t-butylperoxy)-4-thiaheptane,
2,2,9,9-tetrakis(t-butylperoxy)-4,7-dithiadecane,
1-[2,2-bis(t-butylperoxy)propylmercapto]-3-[1-methyl-5,5-bis(t-butylperoxy)-3-thiahexyl]-6-methylcyclohexane,
2,2,19,19-tetrakis(t-butylperoxy)-4,17-dithiaeicosane,
1,4-bis[4,4-bis(t-butylperoxy)-2-thiapentyl]benzene,
5,5-bis(t-butylperoxy)-2,8-dithianonane,
3,3-bis(t-butylperoxy)-1,5-bis(phenylmercapto)pentane,
1-phenylsulfonyl-2,2-bis(t-amylperoxy)propane,
1-phenylsulfonyl-2,2-bis(1,1,3,3-tetramethylbutylperoxy) propane,
1-phenylsulfonyl-2,2-dicumylperoxy propane,
1-phenylsulfonyl-2,2-bis(3-hydroxy-1,1-dimethylbutylperoxy) propane,
1-phenylsulfonyl-2,2-bis(chloro-t-butylperoxy)propane, and the corresponding sulfoxide and sulfone derivatives which can be considered to be the successive oxidation products of the illustrative sulfides listed:

1-(3-chloropropylsulfinyl)-3,3-dihydroperoxybutane,
1-(3-chloropropylsulfonyl)-3,3-dihyproperoxybutane,
1-(4-t-butylphenylsulfinyl)-3,3-dihydroperoxybutane,
1-(4-t-butylphenylsulfonyl)-3,3-dihydroperoxybutane,
1-(4-chlorophenylsulfinyl)-3,3-dihydroperoxybutane
1-(4-chlorophenylsulfonyl)-3,3-dihydroperoxybutane,
1-β-naphthylsulfinyl-3,3-dihydroperoxybutane,
1-β-naphthylsulfonyl-3,3-dihydroperoxybutane,
1-(3-phenylpropylsulfinyl)-2,2-dihydroperoxypropane,
1-(3-phenylpropylsulfonyl)-2,2-dihydroperoxypropane,
4,4-dihydroperoxythiacyclohexane-1-oxide,
4,4-dihydroperoxythiacyclohexane-1,1-dioxide,
1,1-dihydroperoxy-3-butylsulfinyl-3,5,5-trimethylcyclohexane,
1,1-dihydroperoxy-3-butylsulfonyl-3,5,5-trimethylcyclohexane,
1,4-bis(2,2-dihydroperoxypropylsulfinylmethyl)benzene,
1,4-bis(2,2-dihydroperoxypropylsulfonylmethyl)benzene,
3,3-dihydroperoxy-1,5-bis(methylsulfinyl)pentane
3,3-dihydroperoxy-1,5-bis(methylsulfonyl)pentane 3,3-dihydroperoxy-1,5-bis(phenylsulfinyl)pentane,
3,3-dihydroperoxy-1,5-bis(phensulfonyl)pentane, Illustrative examples of the invention are:

1-phensulfonyl-2,2-bis(t-butylperoxy(propane,
1-phenylsulfonyl-3,3-bis(t-butylperoxy)butane,
1-phenylsulfonyl-3,3-bis(t-butylperoxy)pentane,
2-methyl-2-phenylsulfonyl-4,4-bis(t-butylperoxy) pentane,
and 1-(t-butylsulfinyl)-3,3-bis(t-butylperoxy)butane.

ILLUSTRATIVE METHODS FOR THE PREPARATION OF SULFUR CONTAINING KETONES

Some methods for the preparation of the types of ketones operable in the process of this invention are set out below.

METHOD I

Preparation of 1-phenylsulfonyl-2-propanone

A mixture of 32.8 g. (0.2 mole) of sodium benzenesulfinate, 18.5 g. (0.2 mole) of chloroacetone and 100 ml. of dimethylformamide was stirred and heated for six hours at 110–115° C. After cooling, the mixture was poured into cold water, the aqueous mixture extracted with benzene and the benzene removed under reduced pressure. The tarry residue was dissolved in methylene chloride, the methylene chloride solution washed with water, decolorized with activated charcoal and the solvent evaporated. Recrystallization of the residue and clarification with additional activated charcoal of a methanol-water solution of the product resulted in the desired product M.P. 55.5–56.5° C.

METHOD II

Preparation of 1-phenylsulfonyl-3-butanone

To a stirred solution of 14.7 g. (0.2 mole) of methyl vinyl ketone in 50 ml. of methanol, was added 30.0 g. (0.21 mole) of benzenesulfinic acid. The reaction mixture was stirred at 45–50° C. for 20 hours. The alcohol solvent was tripped under reduced pressure, the residue dissolved in 250 ml. of benzene and the benzene solution washed with 100 ml. of water and 100 ml. of 10% sodium bicarbonate solution. After drying the benzene solution over anhydrous magnesium sulfate and decolorizing the filtered solution with activated carbon, the benzene was stripped under reduced pressure. The 34.5 g. of crude product M.P. 87–91° C. was obtained in 77.4% of the theoretical yield. The crude product was stirred with 75 ml. of cold methanol and the solid residue dried, M.P. 86–88° C.

METHOD III

Preparation of 2-methyl-2-phenylsulfonyl-4-pentanone

A solution of 16.4 g. (0.1 mole) of sodium benzenesulfinate dissolved in 130 ml. of water was acidified to pH 1 with 77% sulfuric acid solution. The precipitated benzenesulfinic acid was taken up in 200 ml. of ether, the ether layer separated, washed, dried over anhydrous magnesium sulfate, the drying agent removed by filtration and the ether stripped under reduced pressure. Benzene sulfinic acid weighing 11.5 g., M.P. 67–69° C. was obtained by this procedure.

To the benzenesulfinic acid dissolved in 50 ml. of methanol, was added 9.8 g. (0.1 mole) of mesityl oxide and the stirred reaction mixture heated for six hours at 45–55° C. The methanol was stripped under reduced pressure and the residue dissolved in 100 ml. of benzene. The benzene solution was washed with water, sodium bicarbonate solution, dried over anhydrous magnesium sulfate and the drying agent removed by filtration. Removal of the solvent under reduced pressure gave 20.5 g. of product M.P. 81–84° C.

METHOD IV

Preparation of 1-(t-butylmercapto)-3-butanone

To a stirred solution of 35 g. (0.5 mole) of methyl vinyl ketone and 0.75 g. of sodium methoxide dissolved in 50 ml of methanol, was added 47 g. (0.52 mole) of t-butyl mercaptan while the temperature was held at 25–30° C. After the addition was completed, the reaction mixture was allowed to stir at 25–30° C. for sixteen hours.

The reaction mixture was diluted with 150 ml. of ketone, washed with 150 ml. of 5% sodium hydroxide solution and washed to neutrality with water. The pentane solution was dried over anhydrous magnesium sulfate, the drying agent removed by filtration and the pentane removed by stripping under reduced pressure.

The product, 1-(t-butylmercapto)-3-butanone, weighing 63.4 g. was obtained in a yield of 79.5% of theory.

COMPOUNDS OF THE INVENTION

Example 1.—Preparation of 1-phenylsulfonyl-2,2-bis(t-butylperoxy) propane

A solution of 11.88 g. (0.06 mole) of 1-phenylsulfonyl-2-propane dissolved in 59.1 g. (0.6 mole) of 91% t-butyl hydroperoxide was heated in the presence of 5.0 g. of Amberlyst® 15 strong acid ion exchange resin while the pressure on the system was slowly reduced to maintain distilliation of the t-butyl hydroperoxide-water azeotrope. After 3 hours another charge of 35 g. of 91% t-butyl hydroperoxide was added and the reaction continued. The residue was dissolved in benzene, the solution washed with dilute sodium hyroxide solution and water and the benzene evaporated under reduced pressure. The product 1-phenylsulfonyl-2,2-bis(t-butylperoxy) propane, weighing 13.9 g. melted at 89–91° C. and was obtained in a yield of 64.5% of theory. The active oxygen content was 9.2%

Example 2.—Preparation of 1-Phenylsulfonyl-3,3-bis(t-butylperoxy) butane

A mixture of 26.5 g. (0.125 mole) of 1-phenylsulfonyl-3-butanone, 100 ml. of 92% t-butyl hydroperoxide and 20 g. of Amberlyst 15 strong acid type ion exchange resin was stirred at 35° C. while the pressure was reduced to remove the water-t-butyl hydroperoxide azeotrope. An additional 50 ml. of 92% t-butyl hydroperoxide was added during the reaction to complete the removal of the water.

After a total reaction time of 5½ hours the resin catalyst was removed by filtration and the unreacted t-butyl hydroperoxide stripped under reduced pressure. The residue was taken up in benzene, the benzene solution washed with 100 ml. water, 200 ml. of 5% sodium hydroxide solution and 200 ml. of water. After drying over anhydrous magnesium sulfate and removal of the drying agent by filtration, the solvent was removed under reduced pressure. The white crystalline produce (M.P. 93–95° C.) weighed 39.8 g.

Calculated for $C_{18}H_{30}O_6S$: active [O], 8.54%. Found: active [O], 8.34%. The calculated purity was 97.9%.

Example 3.—Preparation of 2-Methyl-2-phenylsulfonyl-4,4-bis(t-butylperoxy) pentane A reaction mixture of 16.8 g. (0.07 mole) of 2-methyl-2-phenylsulfonyl-4-pentanone, 24.1 g. (.250 mole) of 94% t-butyl hydroperoxide, and 5.0 g. of Amberlyst 15 strong acid type ion exchange resin was stirred at about 35° C. while the water-t-butyl hydroperoxide azeotrope was removed under reduced pressure. After one hour an additional 64.1 g. of t-butyl hydroperoxide was added and the reaction continued until the pressure has reached 22 torr. The reaction mixture was diluted with 100 ml of ether, the catalyst separated by filtration and the ether solution washed with 10% sodium hydroxide solution and water. The ether solution was dried over anhydrous magnesium sulfate, the drying agent separated and the ether removed under reduced pressure. The solid residue weighing 12.6 g. was found to have an active oxygen assay of 5.91% of which 2.57% was attributable to t-butyl hydroperoxide. The difference, 3.34%, corresponds to a purity of 42% of the desired product.

Example 4.—Preparation of 1-t-butylsulfinyl-3,3-bis(t-butylperoxy) butane

A mixture of 10 g. of Amberlyst 15 strong acid type ion exchange resin and 100 g. (1.0 mole) of 90% t-butyl hydroperoxide was stirred at 20° C. while 16 g. (0.10 mole) of 1-(t-butylmercapto)-3-butanone was slowly added. The pressure on the system was reduced to 13-16 torr and the t-butyl hydroperoxide-water azeotrope removed by warming the mixture to about 30° C. After 6-7 hours an infrared scan of the reaction mixture showed that the carbonyl band had been markedly decreased and a substantial band at 870 cm.$^{-1}$ commonly ascribed to the t-butyl OO—group had been introduced.

The resin catalyst was separated from the liquid product mixture by filtration and the filtrate washed with 150 ml. of water and 100 ml. of 5% sodium bicarbonate solution. After washing again with water to neutrality, the product was dried over anhydrous magnesium sulfate and the drying agent separated by filtration. The majority of the unreacted t-butyl hydroperoxide was removed by stripping under reduced pressure, the residue taken up in ether and the ethereal solution washed with 10% sodium bisulfite solution at 0-10° C. until the unreacted t-butyl hydroperoxide had been essentially removed. The solution was then washed with 75 ml. of 10% sodium bicarbonate solution and then with water to neutrality. After drying over anhydrous magnesium sulfate the drying agent was removed by filtration and the ether stripped under reduced pressure. The crude product weighing 18.4 g. was obtained in 55% of the theoretical yield. By recrystallization from pentane the crystalline product M.P. 99-100° C. was obtained.

Calculated for $C_{16}H_{34}O_5S$: Active [O], 9.47%; S, 9.47% Found: Active [O], 9.28%; S, 9.8%.

Examination of the infrared spectrum of the compound in a Nujol mull showed the expected absorptions and indicated that in the course of the perketal formation reaction, the sulfide was oxidized to the corresponding sulfoxide.

Oxidation of the sulfoxide to the sulfone can be accomplished by known procedures such as those using peracids (performic, peracetic, or perbenzoic) or inorganic oxidizing agents (potassium permanganate and chromic acid). (See C. M. Suter, "The Organic Chemistry of Sulfur," John Wiley & Sons, Inc., N.Y., (1944), page 660 ff.)

The hereinbefore disclosed method for the preparation of peroxidic derivatives of sulfur containing compounds employs ion exchange catalysis and azeotropic removal of the water formed in the course of the reaction. Alternate means for the removal of water, and other acidic catalysts such as sulfuric acid, phosphoric acid, oxalic acid, perchloric acid, or other strongly acidic ion exchange resins such as Amberlite IR 200, and Dowex 50, may also be used in the preparation of the compounds of this invention.

Thus having described methods for the preparation of peroxidic derivatives of sulfur containing compounds having one available keto group, it would be obvious to one skilled in the art to extend these methods to include sulfur containing compounds having more than one available keto group present. Illustrative ketone reactants and peroxidic reaction products are listed hereinbefore.

UTILITY

Illustration A.—Curing of polyester resins

Polymerization tests were carried out using the "S.P.I. Procedure for Running Exotherm Curves-Polyester Resins"—published in the Preprint of the 16th Annual Conference—Reinforced Plastics Division Society of the Plastics Industry, Inc. February 1961.

The tests were run in general purpose "Standard" unsaturated polyester resin having the following formulation.

| | | |
|---|---|---|
| Maleic anhydride | mole | 1.0 |
| Phthalic anhydride | do | 1.0 |
| Propylene glycol | moles | 2.2 |
| Acid number of alkyd resin | | 35–45 |
| Inhibitor (hydroquinone), (percent of final solution) | | 0.013 |
| Styrene monomer, (percent of final solution) | | 32–34 |

TABLE I

Exotherm measurements at 240° F.
(1% by weight of initiator)

| | Gel Time, min. | Cure Time, min. | Exotherm, ° F. | Barcol [1] |
|---|---|---|---|---|
| 1-phenylsulfonyl-3,3-bis (t-butyl-OO-peroxy)butane | 3.4 | 4.6 | 450 | 40–45 |
| t-Butyl peroxybenzoate [2] | 4.7 | 5.8 | 451 | 40–45 |
| 1-(t-butylsulfinyl)-3,3-bis(t-butyl-peroxy) butane [3] | 5.4 | 6.8 | 402 | 30–35 |

[1] Barcol impressor reading (Model GYZj-934-1).
[2] Commercial initiator active in this temperature range used for comparative purposes.
[3] 0.87% by weight used to equate active oxygen content.

It can be seen from the above data that the sulfonyl peroxyketal is a slightly faster initiator and gives equivalent cures, showing the presence of sulfur has no deleterious effect in polyester curing.

Illustration B.—Crosslinking of PVC (polyvinyl chloride)

| | | |
|---|---|---|
| PVC Resin-Exon 905, (Firestone general purpose resin) | parts | 100 |
| Lead Stabilizer-Dyphos Pb (National Lead) | do | 5 |
| Lead Stabilizer-peroxyketal (100% peroxyketal) | moles | 0.015 |

Ingredients were dispersed on a Farrel 2-roll mill at 240° F. After mulling, the compounded PVC was cured in a press for 15 minutes at 375° F.

To test for crosslinking, a weighed sample was immersed in tetrahydrofuran for 16–18 hours at 77° F., removed, dried and reweighed. The amount undissolved is taken as the extent of crosslinking.

TABLE II.—CROSSLINKING OF PVC

| Peroxyketal | Phr.[1] | Percen Crosslinking |
|---|---|---|
| (a) 1-phenylsulfonyl-3,3-bis (t-butylperoxy) butane | 2.74 | 96.4 |
| (b) 1-phenylsulfonyl-3,3-bis (t-butylperoxy) pentane | 2.84 | 98.2 |

[1] Parts per hundred parts of resin.

The data in Table II indicates that excellent results are obtained in the crosslinking of polyvinyl chloride.

Thus having described the invention what is claimed is.

1. A sulfur containing peroxyketal selected from the group consisting of:

I.

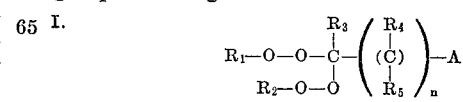

and

II.

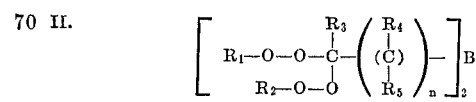

where:

$n$ is an integer equal to at least one,

A is a radical selected from the group consisting of $R_6S(O)_2-$, $R_6S(O)-$, and $R_6S-$, B is a biradical selected from the group consisting of $-S(O)_2-$, $-S(O)-$, $-S-$, $-S-D-S-$, $-S(O)-D-S-$, $-S(O)-D-S(O)-$, $-S(O)_2-D-S(O)_2-$, and $-S(O)_2-D-S(O)-$, D is a biradical selected from the group consisting of alkylene having 1–18 carbon atoms, and cycloalkylene having 4–12 carbon atoms, $R_1$ and $R_2$ are each selected from the group consisting of hydrogen, alkyl, chloroalkyl, aralkyl, said alkyls having not more than 15 carbon atoms, and cycloalkyl having 4–12 carbon atoms, $R_3$ is selected from the group consisting of alkyl having 1–18 carbon atoms, and cycloalkyl having 4–12 carbon atoms, $R_4$ and $R_5$ are each selected from the group consisting of hydrogen, alkyl having 1–18 carbon atoms, and cycloalkyl having 4–12 carbon atoms, $R_6$ is selected from the group consisting of hydrogen, alkyl, chloroalkyl, aralkyl, said alkyls having not more than 18 carbon atoms, cycloalkyl having 4–12 carbon atoms, aryl and chloroaryl, said aryls having 6–15 carbon atoms, and $R_3$ and $R_4$ taken together, and $R_4$ and $R_5$ taken together may form a ring.

2. A sulfur containing peroxyketal according to claim 1, being 1-phenylsulfonyl-2,2-bis(t-butylperoxy) propane.

3. A sulfur containing peroxyketal according to claim 1, being 1-phenylsulfonyl-3,3-bis (t-butylperoxy) butane.

4. A sulfur containing peroxyketal according to claim 1, being 1-phenylsulfonyl-3,3-bis(t-butylperoxy)pentane.

5. A sulfur containing peroxyketal according to claim 1, being 2-methyl-2-phenylsulfonyl-4,4-bis(t-butylperoxy)-pentane.

6. A sulfur containing peroxyketal according to claim 1, being 1-(t-butylsulfinyl)3,3-bis(t-butylperoxy)butane.

References Cited

UNITED STATES PATENTS 3,043,824   7/1962   Oswald et al. ____ 260—609 XR
3,192,264   6/1965   Weissermel et al. __ 260—607 XR CHARLES B. PARKER, Primary Examiner D. R. PHILLIPS, Assistant Examiner U.S. Cl. X.R.

260—609, 75, 92.8, 865, 327, 332.1, 332.3